United States Patent [19]

Wissler

[11] 4,253,677
[45] Mar. 3, 1981

[54] FOLDING UTILITY CART

[76] Inventor: Carl R. Wissler, 1345 Morningside Dr., Fort Myers, Fla. 33901

[21] Appl. No.: 65,725

[22] Filed: Aug. 10, 1979

[51] Int. Cl.$^3$ .............................................. B62B 1/12
[52] U.S. Cl. ...................................... 280/40; 280/652; 280/656; 280/47.18; 280/47.33; 280/47.37 R
[58] Field of Search ..................... 280/7.1, 39, 40, 645, 280/646, 652, 653, 655, 659, 47.18, 47.37 R, 87.05, 656, 651, 47.26, 47.23, 47.17, 491 A

[56] References Cited

U.S. PATENT DOCUMENTS

| 125,126 | 4/1872 | Eastman | 280/87.05 |
|---|---|---|---|
| 1,305,106 | 5/1919 | Hofer | 280/47.18 |
| 2,171,068 | 8/1939 | Masters | 280/47.18 |
| 2,469,506 | 5/1949 | Kerr et al. | 280/40 |
| 2,879,072 | 3/1959 | Rear et al. | 280/40 |
| 3,403,924 | 10/1968 | Olivera | 280/656 |
| 4,126,324 | 11/1978 | Browning | 280/656 |

FOREIGN PATENT DOCUMENTS 870380 3/1942 France .................................. 280/655

Primary Examiner—David M. Mitchell
Attorney, Agent, or Firm—Alfred E. Wilson

[57] ABSTRACT

A folding utility cart including a rectangular floor panel, a pair of side walls hinged along respective side edges of the floor panel for pivotal movement between vertical erected positions and horizontal, generally prone positions atop the floor panel, and a pair of opposed side wheels journaled relative to the respective side walls. Front and rear end wall panels are slidably received between respective ends of the side walls in their erected positions, and said front and rear end panels each include a pair of oppositely laterally extended top edge projections including downwardly extended fixed pins to engage through holes in top rail portions of the side walls to securely lock the side, front and rear walls in fully erected positions. At their rear ends, the side wall top rails include sleeve sockets to slidably receive the respective ends of a generally U-shaped handle, and the rear pin holes extend through the sleeves and handle ends in a manner whereby the rear wall pins serve to lock the handle in place when the rear wall is properly engaged between the side wall rear ends in their erected positions. Downwardly projecting lugs from the bottom edges of the front and rear walls respectively engage front and rear edge portions of the floor panel.

8 Claims, 6 Drawing Figures

FOLDING UTILITY CART

BACKGROUND OF THE PRESENT INVENTION

The present invention pertains to a folding utility cart which may be provided as a substantially sized garden cart with a box capacity of 5 cubic feet, for example, or a smaller unit sized to carry a single garbage can. In either event, a minimum amount of storage space is required.

To prepare for storage the front and rear end panels of the box are slid upwardly from between the front and rear ends of the side panels. This permits removal of a rear end handle and the folding of the side wall panels to generally prone positions atop the floor panel with a side wheel extending upwardly from each side panel. The end wall panels and handle may then be placed atop the folded box and wheel assembly for flat storage, or they may be leaned against a wall or hung up out of the way. In any event a minimal amount of storage space is needed.

Therefore, one of the principal objects of the present invention is to provide a utility cart including a floor panel and a pair of opposed side wall panels, hingedly connected along respective side edges of the floor panel for swinging erection to vertical positions along said side edges from generally prone positions atop the floor panel.

Another object of the invention is to provide a pair of side wheels for the cart, each of which is rotatably fixed to one of the side walls for swinging movement therewith.

A further object of the invention is to provide removable front and rear end panels to respectively span front and rear ends of the side walls, and including means to properly position said end panels and to automatically lock said side walls and end panels in erected positions relative to the floor panel.

Yet another object of the invention is to provide a pair of sleeve sockets fixed relative to respective top rear ends of the side walls for reception of respective ends of a generally U-shaped handle and including means to automatically lock the handle in place when the rear end wall panel is securely locked between the side wall panels.

DETAILED DESCRIPTION OF THE DRAWINGS

Figure 1:
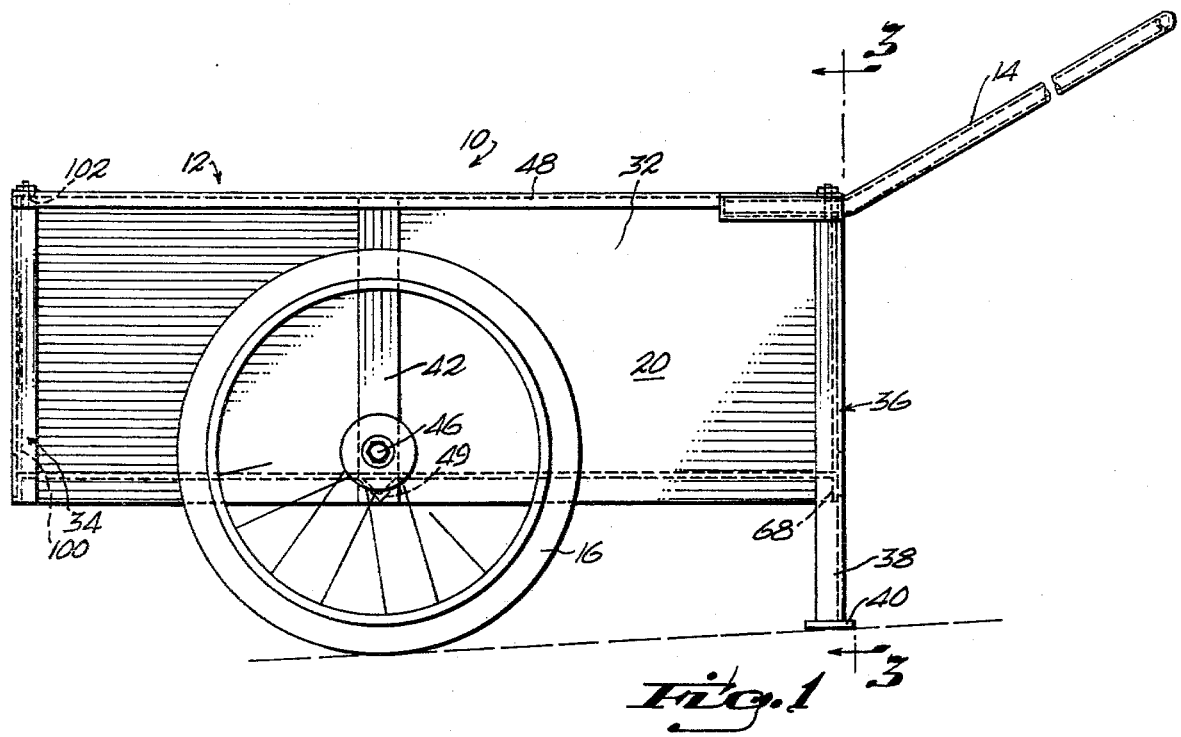
FIG. 1 is a side elevational view of one preferred form of the folding utility cart of the present invention.
Figure 2:
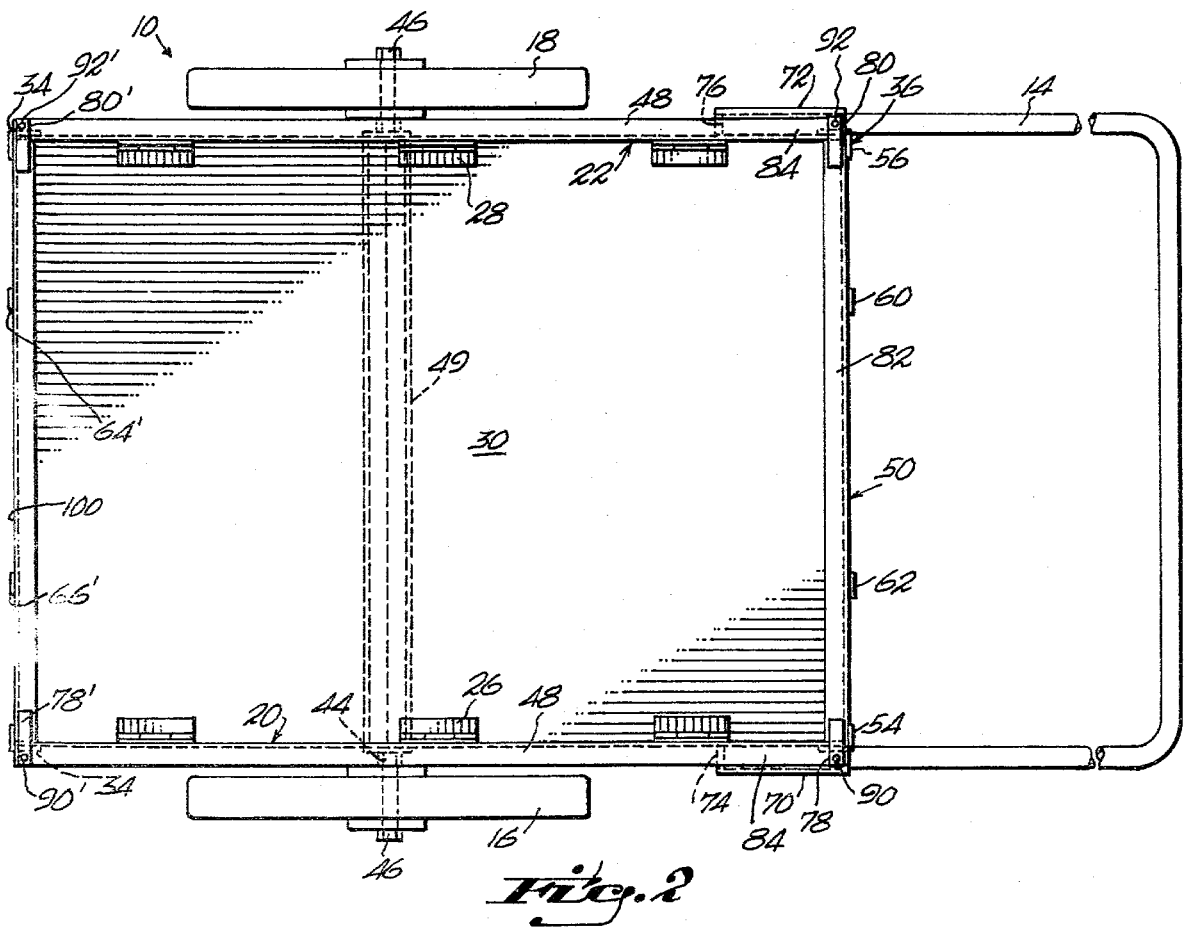
FIG. 2 is a top plan view of the cart of FIG. 1.

With reference to the drawings and particularly to FIGS. 1 and 2, the numeral 10 generally designates the folding utility cart of the present invention which includes a load carrying box 12, preferably formed of an appropriate sheet metal, with a rear end, generally U-shaped handle 14, and a pair of opposed side wheels 16, 18 rotatably carried by respective side wall panels 20, 22 of box 12. Side walls 20, 22 are respectivly hinged by pluralities of hinges 26, 28 to opposed top, side edge portions of a floor panel 30.

Each side wall panel, such as 20, in one preferred form as illustrated, is formed of a main panel portion 32 with a vertical angle member 34 fixed as by welding along a front edge thereof and a second vertical angle member 36 fixed along its rear edge. Angle 36 may include a downward extension 38 with a foot 40, fixed at its bottom end to provide a four point support for the cart in an "at rest" position.

Figure 3:
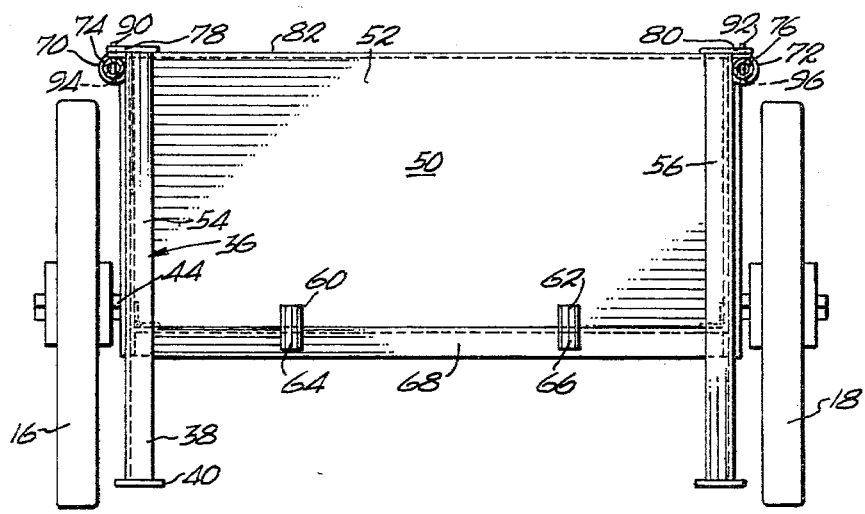
FIG. 3 is a view taken along line 3—3 of FIG. 1.

Intermediate the length of each side wall panel, a vertical reinforcing strip 42 is fixed in place as by welding, and a nut 44, FIGS. 2 and 3, is welded thereto to receive a wheel mounting bolt 46. The top edge of each side wall panel 20, 22 is formed into a reinforcing rail 48 which may define an inverted channel configuration and a transverse angle member 49 spans the bottom of floor panel 30.

With particular reference to FIGS. 2 and 3, a rear end panel 50 spans the rear vertical edges of side wall panels 20, 22, and includes a main panel portion 52 which is sized to slide downwardly along the inside of webs 54, 56 of the rear angle member 36. A pair of lugs 60, 62 are fixed as by welding along the bottom edge of panel portion 52 and include downward projections 64, 66 to overlie a downwardly turned rear end flange 68 of floor panel 30.

Sleeve sockets 70, 72 are provided adjacent the rear top edges of side wall panel 20, 22 to slidably receive respective end portions 74, 76 of U-shaped handle 14, and oppositely outwardly extended projections 78, 80 from the top edge portion 82 of rear end panel 50 overlie the top surfaces 84 of side wall panels 20, 22 above the sleeve sockets 70, 72. Respective lock pins 90, 92 are fixed as by welding, to projections 78, 80 and extend downwardly through respective holes 94, 96 in sleeve sockets 70, 72 and handle ends 74, 76. Projections 78, 80 may be integrally formed from the top edge of rear end panel 50 or, as illustrated, be comprised of separate members welded thereto.

A front end panel 100 is similar to rear end panel 50, including downward projections 64', 66', outward top projections 78', 80' and fixed pins 90', 92'. However, lock pins 90', 92' are simply seated through apertures 102 in the top edge reinforcing rails 48 of side walls 20, 22, and front panel 100 is confined in place by front angle members 34.

Figure 4:
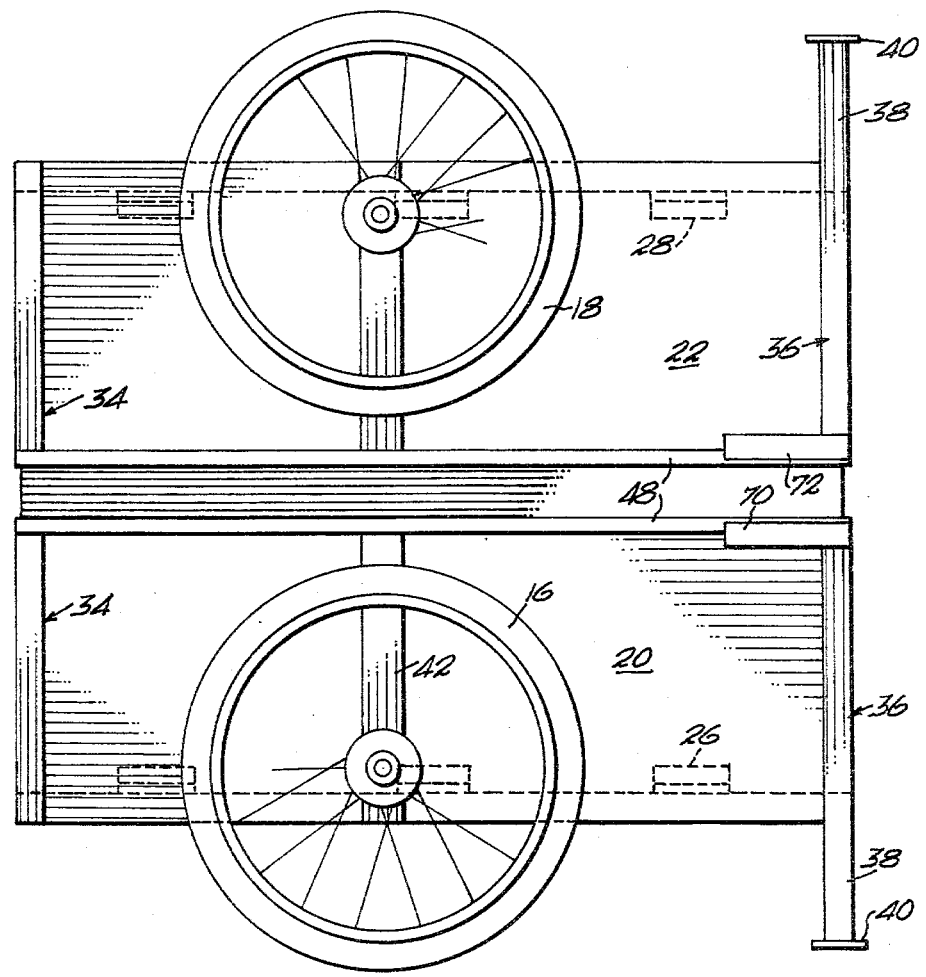
FIG. 4 is a top plan view of the floor panel, and side wall panels and wheels in a collapsed condition.

Therefore, when the front and rear end panels 100 and 50 are slid upwardly and removed from the cart assembly, the handle 14 may be slid from sockets 70, 72 and the side wall panels 20, 22 with the respective wheel assemblies 16, 18 may be pivoted inwardly about hinges 26, 28 to lie flat on the floor panel 30 as illustrated in FIG. 4.

To reassemble the cart 10, the side wall panels 20, 22 are pivoted to the vertical positions of FIGS. 1, 2 and 3, the handle end portions 74, 76 are inserted in sockets 70, 72, and the rear and front wall panels 50, 100 are vertically reengaged inside of respective angle members 36, 34 as above described. The lock pins 90, 92 and 90', 92' are thereby reengaged in the proper holes 94, 96 and 102 as above described to reassemble the cart in the condition illustrated in FIGS. 1, 2 and 3.

Figure 5:
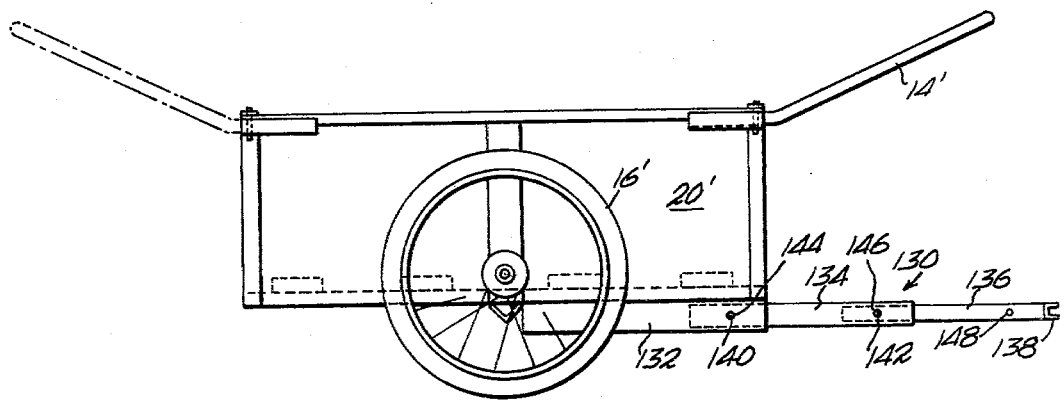
FIG. 5 is a side view, similar to FIG. 1, of a modified form of the cart of the present invention.
Figure 6:
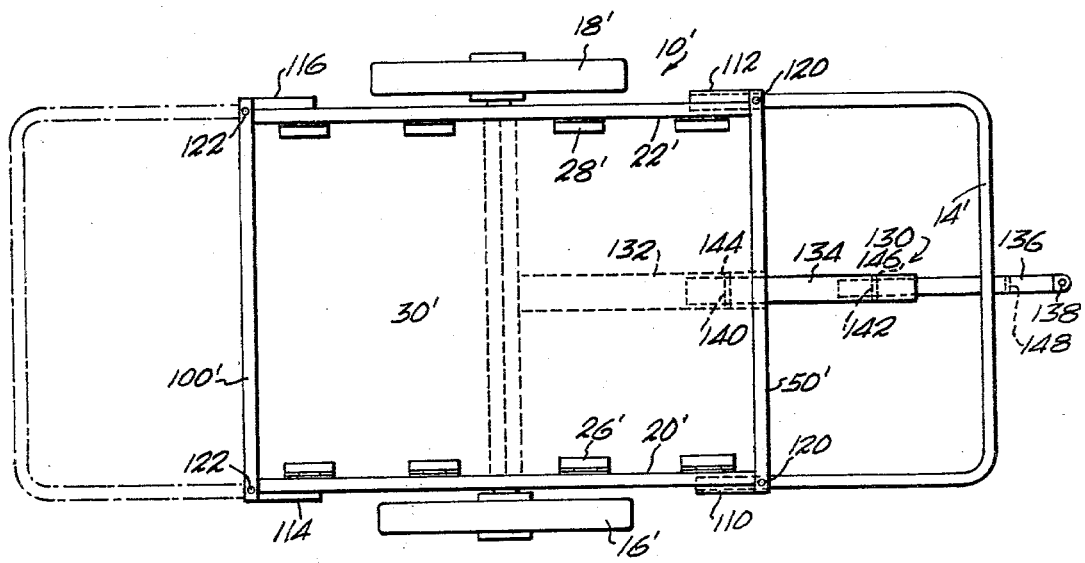
FIG. 6 is a top plan view of FIG. 5.

FIGS. 5 and 6 illustrate a somewhat modified form of the invention. In general, the floor, side wall and front and back panels, indicated by like prime numbers, are the same as above described and the folding and erecting operations are also identical. However, pairs of sleeve sockets 110, 112 and 114, 116 are provided on both ends of the cart 10' whereby the handle 14' may be selectively secured to either end thereof by pairs of lock pins 120, 120' and 122, 122' as illustrated in FIGS. 5 and 6.

The modification also includes a telescopic tongue 130 comprised of a tubular member 132 fixed longitudinally centrally to the underside of the floor panel 30' and a pair of telescopic tubes 134, 136 with a hitch means such as clevis 138 fixed to the extended end of tube 136. The tubes are illustrated fixed in a fully extended position by pins 140, 142 engaged through appropriate holes 144, 146. A hole 148 through the outer end portion of tube 136 permits the tongue to be fixed by pin 140 at an intermediate length with the tube 136 retracted in tube 134 or both tubes 134, 136 may be fixed in a fully retracted condition within fixed tube 132 by means of pin 140.

Therefore, the cart of FIGS. 5 and 6 may be used as an easy rolling hand operated utility cart from either end or a trailer for coupled attachment to a riding mower or garden tractor, for example.

I claim:

1. A folding utility cart comprising an open top load carrying box including a generally rectangular floor panel, a pair of generally rectangular side wall panels hingedly connected along respective longitudinal side edge portions of said floor panel for respective opposite inward pivotal movement from vertical box forming positions to substantially flat positions atop said floor panel;

(a) a pair of wheels, each of which is rotatably journaled relative to one of said side wall panels in a manner whereby said pair are substantially in axial alignment for rolling engagement on a support surface with said side wall panels in said vertical positions, and are individually companionately positioned with said related side wall panels by said pivotal movements thereof;
    (b) generally rectangular removable front and rear end wall panels;
    (c) means to position said front and rear end wall panels in respective spanning relation between opposed front and rear vertical edges of said pair of side wall panels in their vertical positions;
    (d) a generally U-shaped handle extending outwardly from one end of said cart for manual manipulation thereof;
    (e) socket means fixed relative to said side wall panels to slidably receive respective end portions of said U-shaped handle with said side wall panels in said vertical positions;
    (f) means, carried by said front and rear end wall panels, to lock said side, front and rear wall panels in vertical positions when said front and rear wall panels are inserted in said means to position, and to lock said U-shaped handle end portions in said socket means when said end portions are positioned therein.

2. The cart as defined in claim 1 wherein said means to position includes corresponding pairs of angle members fixed along front and rear edges of said side wall panels, each of said pairs of angle members including oppositely inwardly extending flanges to respectively engage over opposed outer vertical side edge portions of said front and rear end panels to preclude outward movement thereof when said side wall panels are in said vertical positions.

3. The cart as defined in claim 2 wherein said means to position further includes lug means extending downwardly from bottom edge portions of said front and rear end wall panels, intermediate the widths thereof, to engage respectively over front and rear edge portions of said floor panel to preclude inward movement of said bottom edge portions.

4. The cart as defined in claim 1 wherein said means to lock comprises a pair of downwardly extending lock pins, fixed relative to oppositely, laterally outwardly extending side extensions from top edges of each of said front and rear end wall panels, said pairs of lock pins being positioned for through engagement in respective front and rear end pairs of holes formed in respective top edge reinforcing rails of said side wall panels, when said side wall panels are in said vertical positions.

5. The cart as defined in claim 4 wherein said socket means comprises a pair of sleeve sockets fixed relative to top rear end portions of said side wall panels, said sleeve sockets including through holes in adjacent vertical alignment with said reinforcing rails rear end pair of holes, said end handle portions including through holes, alignable with said socket holes, and said lock pins being of such lengths so as to penetrate through said holes in said reinforcing rails and sleeve sockets, and said handle end portions when inserted in said sockets.

6. The cart as defined in claim 5 including a second pair of sleeve sockets fixed relative to top front end portions of said side wall panels, said second sleeve sockets including through holes in adjacent vertical alignment with said reinforcing rails front end pair of holes whereby said end handle portions may be selectively locked in said rear or front end sockets by said front or rear wall lock pins.

7. The cart as defined in claim 1 including a telescopic trailer hitch means fixed to an underside of said floor panel in a generally central longitudinal disposition adjacent one end of said cart.

8. The cart as defined in claim 7 wherein said trailer hitch means includes a first tubular member fixed to said floor panel and a pair of telescopic members engaged therein for movement between fully retracted and extended positions and including lock means to selectively maintain said telescopic members in said fully retracted or extended positions as well and an intermediate extended position, and including hitch means fixed to an outer end thereof.

* * * * *